(12) United States Patent
Molnar et al.

(10) Patent No.: US 8,226,153 B2
(45) Date of Patent: Jul. 24, 2012

(54) AIR GUIDE DEVICE

(75) Inventors: Bela Molnar, Ehningen (DE); Tom Gürtler, Ditzingen (DE); Helmut Eck, Rutesheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 618 days.

(21) Appl. No.: 12/466,742

(22) Filed: May 15, 2009

(65) Prior Publication Data

US 2009/0286461 A1 Nov. 19, 2009

(30) Foreign Application Priority Data

May 16, 2008 (DE) .......... 10 2008 024 892

(51) Int. Cl.
*B60J 1/20* (2006.01)

(52) U.S. Cl. .................. 296/180.1; 296/180.3

(58) Field of Classification Search .......... 296/180.1, 296/180.3, 180.5, 217; 180/903; *B60J 1/20, B60J 7/22*
See application file for complete search history.

(56) References Cited

U.S. PATENT DOCUMENTS

| 6,595,577 | B2 | 7/2003 | Adams | |
|---|---|---|---|---|
| 7,387,331 | B2 | 6/2008 | Froeschle et al. | |
| 7,438,347 | B2 | 10/2008 | Froeschle et al. | |
| 2002/0153744 | A1* | 10/2002 | Long et al. | 296/155 |
| 2007/0228773 | A1* | 10/2007 | Froeschle et al. | 296/180.5 |
| 2007/0236046 | A1* | 10/2007 | Froeschle et al. | 296/180.5 |

FOREIGN PATENT DOCUMENTS

| CN | 101 045471 A1 | 10/2007 |
|---|---|---|
| DE | 4305090 A1 | 8/1994 |
| DE | 10155376(A1) | 5/2003 |
| DE | 103 09 369 A1 | 9/2004 |
| DE | 10 2004 043 544 A1 | 3/2006 |
| DE | 44 27 196 A1 | 3/2006 |
| DE | 10 2005 030 203 A1 | 1/2007 |
| DE | 10 2004 030 571 B4 | 3/2007 |
| DE | 102006009048(A1) | 9/2007 |
| DE | 10 2006 014 259 A | 10/2007 |
| DE | 10 2006 014 260 A1 | 10/2007 |
| DE | 102007011641(A1) | 9/2008 |
| EP | 0 226 778 A2 | 7/1987 |
| JP | 6247346 A | 9/1994 |
| JP | 11034936 | 2/1999 |

OTHER PUBLICATIONS

Korean Notice of Preliminary Rejection, dated Nov. 13, 2010 in corresponding Korean Patent Application No. 10-2009-38015 (English Translation of Office Action).

Chinese Examination report, dated Aug. 25, 2010 in corresponding Chinese Patent Application No. 200910149737.9 (English Translation of Office Action).

German Search Report, dated Mar. 2, 2012 with partial English translation.

* cited by examiner

*Primary Examiner* — Dennis Pedder
*Assistant Examiner* — Jason S Daniels
(74) *Attorney, Agent, or Firm* — RatnerPrestia

(57) ABSTRACT

An air guide device, especially an extendable and retractable rear spoiler on a motor vehicle, with an adjustable air guide element and at least one, also adjustable, flow element designed as an underflow guard. The flow element is designed as a component separate from the air guide element and is connected to it by an adjusting mechanism.

11 Claims, 2 Drawing Sheets

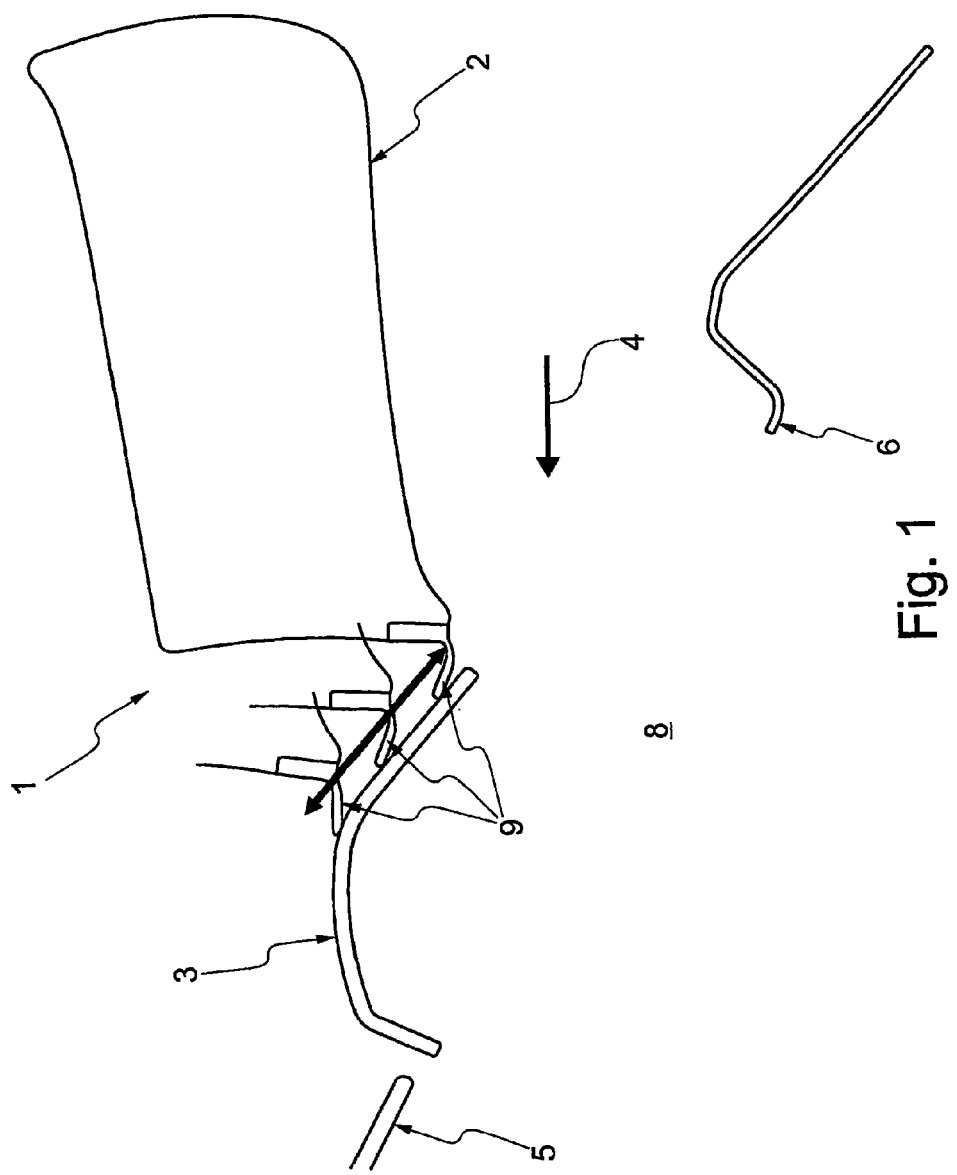

AIR GUIDE DEVICE

CROSS REFERENCE TO RELATED APPLICATIONS

This U.S. application claims priority to German Application DE 10 2008 024 892.4, filed on May 16, 2008, which is incorporated by reference herein in its entirety.

FIELD OF INVENTION

The present invention pertains to an air guide device, especially to an extendable and retractable rear spoiler on a motor vehicle. The invention also pertains to a motor vehicle equipped with an air guide device of this type.

BACKGROUND OF THE INVENTION

An air guide device of the general type in question is known from, for example, EP 0 226 778 A2, which comprises an air guide element and a plate-shaped closure part, designed as an underflow guard. The closure part is designed as an integral part of the air guide element and is thus adjusted together with the guide element between a rest position and an operating position.

Another air guide device, which is arranged in a rear area of a motor vehicle, is known from DE 44 27 196 A1. This device can be moved by an adjusting device from a retracted rest position into an extended operating position. To create a highly effective air guide device which takes up a minimum of space in its rest position, it is provided that the air guide device can be retracted and extended in the height direction of the vehicle and that, when in the operating position, it is connected over its entire transverse dimension to the underlying structure in a manner which prevents the passage of air and also projects above this structure.

Finally, an air guide device for guiding the air flow along a motor vehicle is known from DE 10 2004 043 544 A1. To prevent the air from flowing underneath a spoiler blade and at the same time to be able to carry away intruding water effectively, an underflow guard, which prevents air from flowing underneath the spoiler blade, and a water guide device, which carries away the water coming from the spoiler blade or present in its environment, are provided as integral parts of the spoiler blade.

SUMMARY OF THE INVENTION

The present invention deals with the problem of providing, for an air guide device of the general type in question, an improved or at least a different embodiment which is distinguished by the minimum amount of space it occupies when in the rest position and which at the same time is highly effective when in the extended operating position.

The invention relates to the general idea, in the case of an air guide device with a flow element designed as an underflow guard and an adjustable air guide element such as a spoiler blade, to design these two components as separate from each other and to connect them positively to each other by an adjusting mechanism. The air guide device can be designed, for example, as an extendable and retractable rear spoiler on a motor vehicle. The flow element, which is designed as an underflow guard, prevents the unwanted flow of air underneath the air guide element when the air guide device is in the extended operating state and thus prevents an undesirable decrease in the effectiveness of the air guide device, whereas the adjusting mechanism, which positively connects the adjusting movements of the air guide element with those of the flow element, has the effect that, when the air guide device is in its rest position, the flow element lies just underneath the actual air guide element and thus makes it possible for the air guide device to be stowed especially compactly in its rest position. With the air guide devices known according to the prior art, it has not been possible to realize thus far such a space-saving way to stow the device, with the result that storage wells in the body demanding a large amount of space have always been required for the previous air guide devices. The adjusting mechanism, which can be designed as a lever mechanism, for example, makes it possible for the air guide device not only to be stowed in a minimum of space but also to assume an aerodynamically extremely effective position when in the extended operating state.

The minimum of one flow element advisably carries a sealing element, especially a flexible sealing lip, on its trailing side with respect to the direction of travel. A sealing element of this type, which can be designed as a sealing lip, for example, has the effect sealing off between the flow element and the air guide element when the air guide device is in its operating position. The sealing element is designed to be flexible and is therefore able to conform easily to different adjustment states of the air guide device. In particular, the sealing element can reliably prevent the unwanted flow of air underneath the air guide element, which is especially important for the generation of the desired downforce, especially at high speeds.

In another advantageous embodiment of the inventive solution, the adjusting mechanism comprises a spindle drive. These spindle drives offer the considerable advantage that they can be controlled with great precision; that is, they make it possible to control the adjusting movement of the air guide device with precision, and at the same time they are self-locking, so that, regardless of the selected degree of extension of the air guide device, the drive device which actuates it, such as an electric motor, can be turned off, because the spindle drive or usually the two spindle drives are able by themselves to easily absorb the powerful force of the wind present at high speeds.

Other important features and advantages of the invention can be derived from the drawings, and from the associated description of the figures, which are described on the basis of the drawings.

It should be obvious that the features cited above and yet to be explained below are applicable not only when combined as specifically stated but also in other combinations as well or even when used alone without leaving the scope of the present invention.

BRIEF DESCRIPTION OF THE DRAWINGS

Preferred exemplary embodiments of the invention are illustrated in the drawings and will be explained in greater detail in the following description, where the same, similar, or functionally equivalent components are designated by the same reference numbers.

In schematic form,

FIG. 1 shows a cross-sectional view of an inventive air guide device in the operating position.

DETAILED DESCRIPTION OF THE DRAWINGS

Figure 2A:
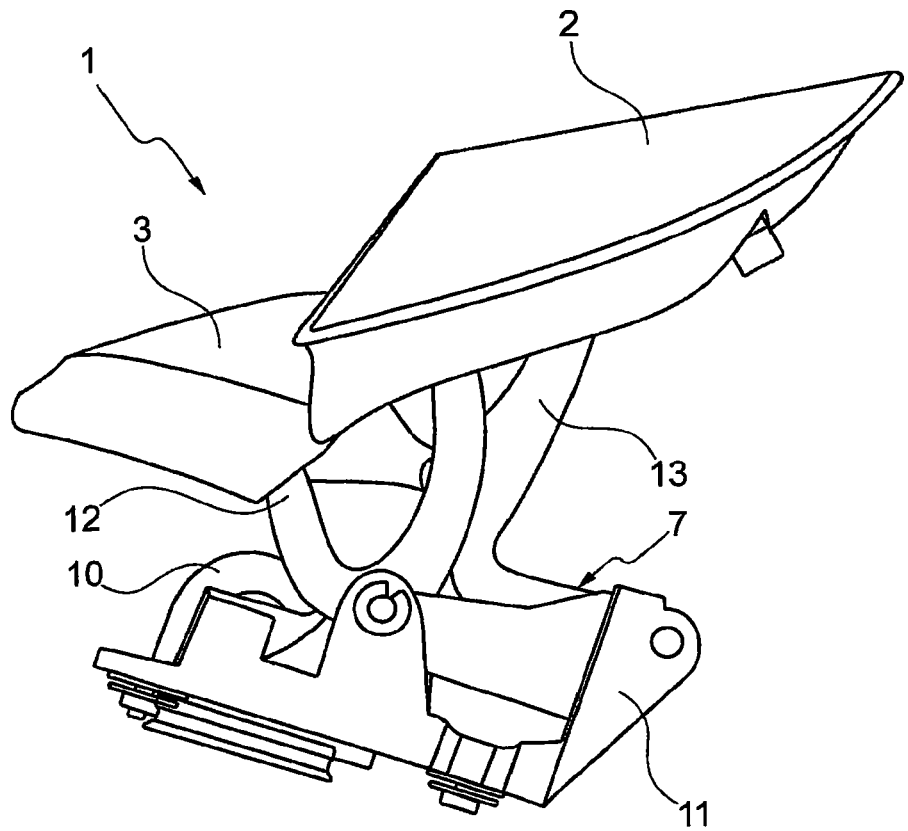
FIG. 2*a* shows a view from the side of the air guide device in its operating position.
Figure 2B:
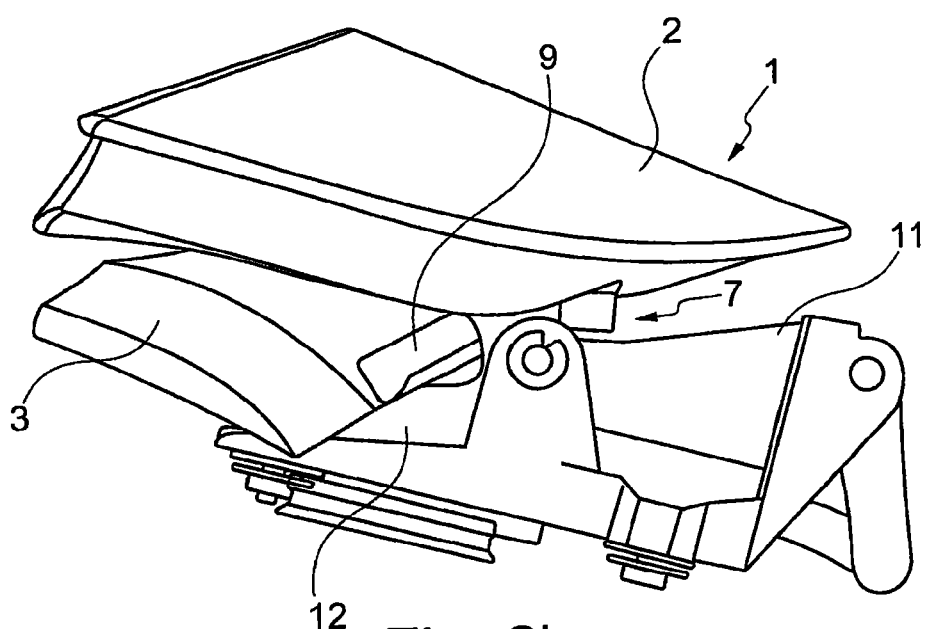
FIG. 2*b* shows a diagram similar to that of FIG. 2*a* but with the air guide device in its rest position.

As shown in FIG. 1, an inventive air guide device 1 comprises an adjustable air guide element 2 and at least one, also adjustable, flow element 3, designed as an underflow guard. The air guide element 2 can be designed as, for example, a spoiler blade and thus bring about the actual air-guiding action and the downforce on the motor vehicle. In general, the air guide device 1 can be arranged in the rear area of a motor vehicle and in particular between a rear edge, with respect to the travel direction 4, of a rear window 5 and a forward edge of a trunk lid 6. The air guide device 1 or its air guide element 2 can be adjusted between a rest position, as shown in FIG. 2b, and one or more operating positions, as illustrated in FIGS. 1 and 2a. In its operating state, the air guide device 1 generates a downforce, which helps to improve the vehicle's grip on the road.

To prevent effectively the undesirable flow of air underneath the air guide element 2, the flow element 3 is provided, which, when the air guide device 1 is in its operating position, rests on the air guide element 2 in such a way that the flow of air under the air guide element can be reliably excluded. So that it is also possible for the air guide device 1 to occupy only a small amount of space especially when in the rest position, the flow element 3 is, according to aspects of the invention, designed as a component separate from the air guide element 2 and is connected to it by an adjusting mechanism 7, which can be designed, for example, as a lever mechanism (see FIGS. 2a and 2b). This adjustable mechanism 7 makes it possible for the air guide device 1 to be stowed compactly in its rest position, in which it, for example, rests in a body well 8, which is only suggested in FIG. 1. In this stowed state, the flow element 3 lies just underneath the air guide element 2.

As can also be seen in FIG. 1, when the air guide element 2 is extended, the forward edge, with respect to the travel direction 4, of the minimum of one flow element 3 adjoins a body of the motor vehicle, here the rear window 5 of the vehicle, so that it is possible preferably to prevent any undesirable flow of air at all through the body well 8. It can also be derived from FIG. 1 that the air guide element 2 carries a sealing element 9 on its forward edge with respect to the travel direction 4, especially a sealing lip. Of course, it is also conceivable that the sealing element 9 could be on the rear edge of the flow element 3 rather than on the forward edge of the air guide element 2. FIG. 1 shows the air guide element 2 in several different extension states, where, however, common to all of them is the fact that the sealing element 9 rests tightly on the flow element 3 and thus seals off the transition area between the air guide element 2 and the flow element 3.

Upon consideration of FIGS. 2a and 2b, it can be seen that a drive device 10, especially an electric motor, is provided to adjust the air guide device 1. This can be arranged in a central position, for example, and comprise two coaxial, flexible drive shafts. The ends of these shafts which face away from the electric motor or from the drive device 10 cooperate with adjusting mechanisms 7 located at the sides. The adjusting mechanism 7 comprises preferably a spindle drive (not described in detail), which is designed to be self-locking and which is thus able to hold the air guide element 2 in its extended position without any power being supplied to the electric motor, i.e., without the need for the drive device 10 to generate any drive power. The adjusting mechanism 7 also comprises a carrier element 11 and two adjusting levers 12, 13 supported rotatably thereon, the adjusting lever 12 being connected rotatably to the air guide element 2 and to the flow element 3, the adjusting lever 13 being connected rotatably only to the flow element 3.

As a result of the separation of the flow element 3 from the air guide element 2 as realized in contrast to the prior art, the air guide device 1 can be stored in an especially small amount of space in the body well 8, which means that the latter can be kept correspondingly small. At the same time, however, when the air guide device 1 is extended, that is, when the air guide element 2 is extended, air is effectively prevented from flowing underneath the flow element 3, so that, by means of the air guide element 2, the desired downforce on the motor vehicle can be generated.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. An extendable and retractable air guide device for a motor vehicle comprising:
    an adjustable air guide element; and
    at least one adjustable flow element designed as an underflow guard, wherein the adjustable flow element is a separate component from the adjustable air guide element and is connected to the adjustable air guide element by an adjusting mechanisms,
    wherein the adjusting mechanism comprises a carrier element and an adjusting lever rotatably supported thereon that is connected rotatably to the air guide element and to the flow element.

2. An air guide device according to claim 1, wherein when the air guide element is retracted, at least one adjustable flow element is stowed under the air guide element in a body well of the motor vehicle.

3. An air guide device according to claim 1, wherein when the air guide element is retracted, a forward edge of at least one flow element adjoins a body of the motor vehicle.

4. An air guide device according to claim 3, wherein when the air guide element is retracted, a forward edge of at least one flow element adjoins a rear window of the motor vehicle.

5. An air guide device according to claim 1, wherein a rear edge, with respect to a travel direction of the motor vehicle, of at least one flow element carries a sealing element or a sealing lip, or
    wherein a forward edge, with respect to the travel direction of the motor vehicle, of the air guide element carries a sealing element or a sealing lip.

6. An air guide device according to claim 5, wherein at least when the air guide element is fully extended, the sealing element seals off an intermediate space between the air guide element and the flow element.

7. An air guide device according to claim 1 further comprising a drive device for adjusting the air guide device, said drive device comprising a central electric motor cooperating with the adjusting mechanism of the air guide device.

8. An air guide device according to claim 1, wherein the adjusting mechanism comprises another adjusting lever that is rotatably supported on the carrier element, said another adjusting lever being connected rotatably only to the flow element.

9. An air guide device according to claim 1, wherein the adjusting mechanism comprises a spindle drive.

10. A motor vehicle with an extendable and retractable air guide device comprising:
    an adjustable air guide element; and
    at least one adjustable flow element designed as an underflow guard, wherein the adjustable flow element is a separate component from the adjustable air guide element and is connected to the adjustable air guide element by an adjusting mechanism, wherein the adjusting mechanism comprises a carrier element and an adjusting lever rotatably supported thereon that is connected rotatably to the air guide element and to the flow element.

11. A motor vehicle according to claim 10, wherein the adjusting mechanism comprises another adjusting lever that is rotatably supported on the carrier element, said another adjusting lever being connected rotatably only to the flow element.

* * * * *